United States Patent
Ramalingam et al.

(10) Patent No.: US 9,430,847 B2
(45) Date of Patent: Aug. 30, 2016

(54) METHOD FOR STEREO VISUAL ODOMETRY USING POINTS, LINES AND PLANES

(71) Applicant: Mitsubishi Electric Research Laboratories, Inc., Cambridge, MA (US)

(72) Inventors: Srikumar Ramalingam, Cambridge, MA (US); Yuichi Taguchi, Arlington, MA (US); Michel Antunes, Luxembourg (LU); Raquel Urtasun, Ontario (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 7 days.

(21) Appl. No.: 14/302,623

(22) Filed: Jun. 12, 2014

(65) Prior Publication Data
US 2015/0363938 A1   Dec. 17, 2015

(51) Int. Cl.
| | |
|---|---|
| *G06K 9/00* | (2006.01) |
| *G06T 7/20* | (2006.01) |
| *G06K 9/52* | (2006.01) |
| *G06K 9/62* | (2006.01) |
| *G06T 3/00* | (2006.01) |
| *G06T 17/10* | (2006.01) |

(52) U.S. Cl.
CPC . *G06T 7/20* (2013.01); *G06K 9/52* (2013.01); *G06K 9/6256* (2013.01); *G06T 3/00* (2013.01); *G06T 7/2033* (2013.01); *G06T 17/10* (2013.01); *G06T 2207/10021* (2013.01); *G06T 2207/10028* (2013.01); *G06T 2207/20021* (2013.01); *G06T 2207/20081* (2013.01)

(58) Field of Classification Search
USPC ................................................ 382/103, 154
See application file for complete search history.

(56) References Cited

U.S. PATENT DOCUMENTS

| | | | |
|---|---|---|---|
| 6,862,364 B1 * | 3/2005 | Berestov | G06T 5/008 345/426 |
| 8,224,071 B2 | 7/2012 | Ramalingam et al. | |
| 8,442,305 B2 | 5/2013 | Ramalingam | |
| 2006/0269123 A1 * | 11/2006 | Horita | G06T 7/0071 382/154 |
| 2010/0201682 A1 * | 8/2010 | Quan | G06K 9/00704 345/419 |

(Continued)

OTHER PUBLICATIONS

B. Kitt, A. Geiger, and H. Lategahn, Visual odometry based on stereo image sequences with ransac-based outlier rejection scheme, IV, 2010.

(Continued)

*Primary Examiner* — Alex Liew
(74) *Attorney, Agent, or Firm* — Gene Vinokur; Hironori Tsukamoto; James McAleenan

(57) ABSTRACT

A method determines a motion between a first and second coordinate system, by first extracting a first set of primitives from a 3D image acquired in the first coordinate system from an environment, and extracting a second set of primitives from a 3D image acquired in the second coordinate system from the environment. Motion hypotheses are generated for different combinations of the first and second sets of primitives using a RANdom SAmple Consensus procedure. Each motion hypothesis is scored using a scoring function learned using parameter learning techniques. Then, a best motion hypothesis is selected as the motion between the first and second coordinate system.

15 Claims, 2 Drawing Sheets

(56) References Cited

U.S. PATENT DOCUMENTS

| | | | |
|---|---|---|---|
| 2010/0284607 A1* | 11/2010 | Van Den Hengel | G06T 7/0067 |
| | | | 382/154 |
| 2012/0308114 A1 | 12/2012 | Othmezouri et al. | |
| 2012/0321134 A1* | 12/2012 | Shen .................. | G06K 9/00208 |
| | | | 382/103 |
| 2014/0003705 A1 | 1/2014 | Taguchi et al. | |

OTHER PUBLICATIONS

A. Milella and R. Siegwart, Stereo-based ego-motion estimation using pixel tracking and iterative closest point, ICCVS, 2006.

S. Ramalingam, S. Bouaziz and P. Sturm, Pose estimation using both points and lines for geo-localization, ICRA, 2011.

Y. Taguchi, Y. Jian, S. Ramalingam and C. Feng, Point-plane SLAM for Hand-Held 3D Sensors, ICRA 2013.

S. Ramalingam and Y. Taguchi, A theory of minimal 3D point to 3D plane registration and its generalization, IJCV, 2012.

Hao et al. "Interactive 3D Modeling of Indoor Environments with a Consumer Depth Camera," Proceedings of the 13th International Conference on Ubiquitous Computing, Jan. 1, 2011. p. 75.

Lu et al. "Automatic Building Exterior Mapping using Multilayer Feature Graphs," 2013 IEEE International Conference on Automation Science and Engineering, Aug. 17, 2013, pp. 162-167.

Laifeng et al. "A Two View Based Multilayer Feature Graph for Robot Navigation," Robotics and Automation (ICRA) 2012 IEEE International Conference On, IEEE. May 14, 2012, pp. 3580-3587.

Taguchi et al. "Point-Plane SLAM for hand-held 3D Sensors," 2013 IEEE International Conference on Robotics and Automation (ICRA) May 6-10, 2013. Karlsruhe, Germany, IEEE US, May 6, 2013, pp. 5182-5189.

* cited by examiner

METHOD FOR STEREO VISUAL ODOMETRY USING POINTS, LINES AND PLANES

FIELD OF THE INVENTION

The invention relates generally to computer vision, and more particularly to determining motion between two coordinate systems using points, lines and planes as geometric primitives, where each coordinate system corresponds to a camera coordinate system of a stereo camera or a red, green, blue and depth (RGBD) sensor.

BACKGROUND OF THE INVENTION

Visual odometry uses data acquired by moving sensors to estimate change in motion over time. Numerous methods are known for estimating the motion using geometric primitives such as points, lines and planes. For example, one can determine the motion using correspondences between 3D points in one coordinate system to another coordinate system. As expected, different types of solvers have different advantages and disadvantages, which mean that failure modes of one particular method may not be present in another one.

One method uses three 2D to 3D point correspondences to obtain motion between stereo pairs. 3D to 3D point correspondences are used in an iterative closest point (ICP) method for determining motion between stereo cameras. Some hybrid methods determine motion by mixing two different primitives. For example, points and lines have been used together, see U.S. Pat. No. 8,442,305. Points and planes can also be used together, see U.S. Pat. No. 8,224,071 and U.S. Patent Application 20140003705.

SUMMARY OF THE INVENTION

Problem statement: Given two pairs of stereo images (Left1, Right1) and (Left2, Right2) in two coordinate systems C1 and C2, respectively, the embodiments of the invention determine the rotational and translational motion (R,t) between C1 and C2 using the pairs of stereo images (Left1, Right1 and Left2, Right2).

For each of the four images in two pairs of the stereo images, 2D points and 2D lines are extracted. From the first pair (Left1, Right1), 3D points, 3D lines and 3D planes are determined using triangulation and stereo reconstruction. The 3D primitives are represented in the first coordinate system C1.

Similarly, 3D primitives are extracted from the second stereo pair and represented in C2. The motion (R,t) between C1 and C2 can then be determined, for example, using three 3D points in C1 and their corresponding three 3D points in C2. Similarly, we use different solvers for different combinations of corresponding primitives.

To the best of our knowledge, we are not aware of any work that uses points, lines and planes in both 2D and 3D space for estimating motion. It is not straightforward to extend the existing cases because careful analysis of the geometric primitives is required to compute the motion parameters.

It should be understood that the images can also be acquired by a red, green, blue and depth (RGBD) sensor. Thus, generally the images are 3D images that have both color and depth information, providing both 2D and 3D primitives in each coordinate system.

Each solver determines a motion hypothesis. Using a ground truth, the motion hypothesis and the primitives, parameters of a scoring function are learned. Then, the best motion hypothesis can be selected using the scoring function.

DETAILED DESCRIPTION OF THE PREFERRED EMBODIMENTS

Figure 1:
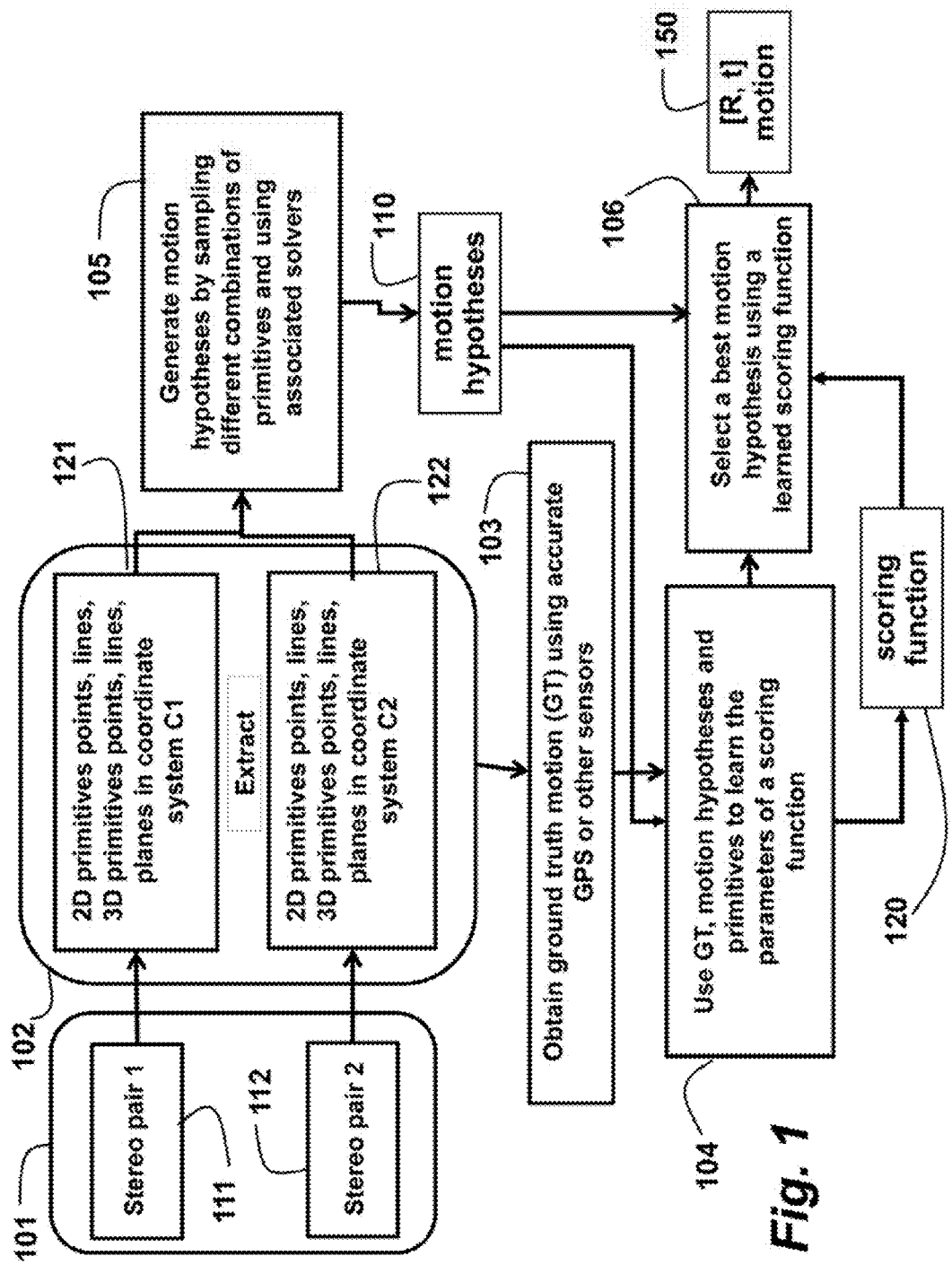
FIG. 1 is a flowchart of a method for estimating motion according to embodiments of the invention.

As shown in FIG. 1, the embodiments of the invention provide a method for estimating motion. Input 101 to the method is two pairs 111 and 112 of stereo images (Left1, Right1) and (Left2 Right2) in two coordinate systems C1 and C2 respectively. Each stereo image can be acquired by a pair of red, green and blue (RGB) cameras calibrated with each other. The embodiments of the invention, determine rotational and translational motion (R,t) 150 between C1 and C2 using the two pairs of stereo images.

It is noted that the images can also be acquired by an RGBD sensor. Hence, generally the images can be considered three-dimensional (3D) images, which can either be represented by a stereo pair or a single RGBD image. It is also possible to use more than two cameras, e.g., a trinocular stereo camera, to increase the accuracy of the depth information.

For each of the four images in two stereo pairs of images or 3D images, 2D points and 2D lines are extracted 102, From the first stereo pair (Left1, Right1) or 3D image, 3D points, 3D lines and 3D planes are extracted 121 using triangulation and stereo reconstruction. The 3D primitives are represented in the first coordinate system C1.

In the case where the 3D images are acquired by an RGBD sensor, only one image is required for each coordinate system.

Similarly, 3D primitives are extracted 122 from the second stereo pair or 3D image, and represented in C2. The motion (R,t) between C1 and C2 can then be determined, for example, using three 3D points in C1 and their corresponding three 3D points in C2. Similarly we consider solvers based on other correspondences, as shown in Table 1.

TABLE 1

| 2D Primitives in Left1 or Right1 | 3D Primitives in C1 | 2D Primitives in Left2 or Right2 | 3D Primitives in C2 |
|---|---|---|---|
| 3 points | | | 3 points |
| 2 points, 1 line | | | 2 points, 1 line |
| 1 point, 2 lines | | | 1 point, 2 lines |
| 3 lines | | | 3 lines |
| | 3 points | | 3 points |
| | 2 lines | | 2 lines |
| | 1 point, 2 planes | | 1 point, 2 planes |
| | 2 points, 1 plane | | 2 points, 1 plane |
| | 3 planes | | 3 planes |
| | 6 points | | 6 planes |
| 3 points | 1 point | 3 points | 1 point |
| 1 point | 2 points | 1 point | 2 points |

Figure 2:
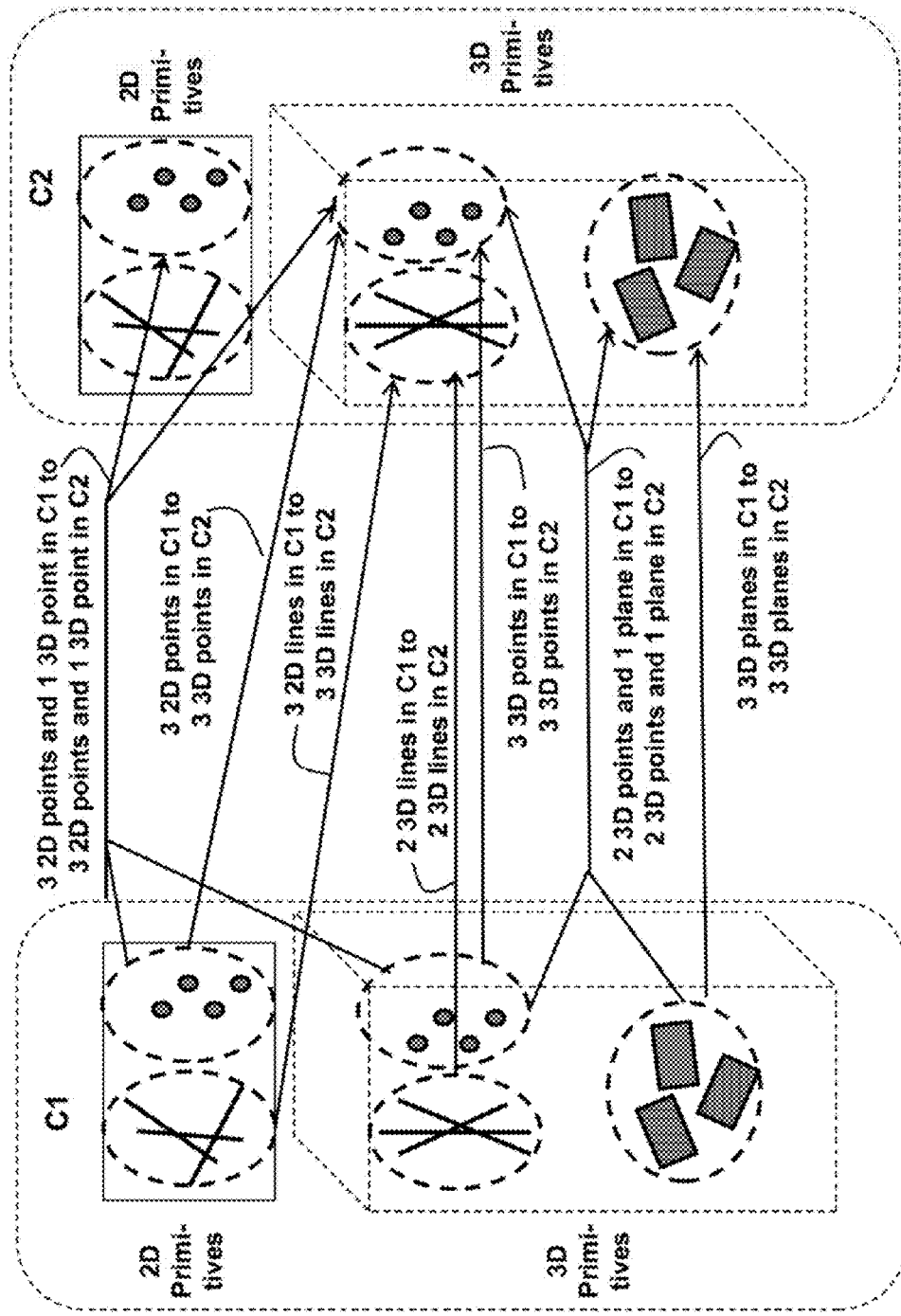
FIG. 2 is a schematic of different combinations of 2D and 3D primitives that can be used by the method of FIG. 1.

Table 1 shows several combinations of primitives that can generate 105 the motion hypotheses. In other words, we consider a set of different motion estimation methods that use correspondences between different sets of 2D and 3D primitives. FIG. 2 visually shows some of the combinations of primitives. Some embodiments can use mixed sets of correspondences as shown in Table 1 and FIG. 2.

We also obtain 103 ground truth (GT) motion for the stereo or RGBD sensors using, e.g., a global positioning system (GPS) or inertial measurement units (combinations of accelerometers and gyroscopes), to learn parameters for our method.

We use a RANdom SAmple Consensus (RANSAC) procedure to sample the correspondences and determine the motion hypotheses 110. Each of these motion estimation methods can be thought of as a function that produces motion (R,t) given a minimal set of correspondences.

In the RANSAC procedure, we use a scoring function 120 that uses all the geometric primitives to determine a score. We use the score to rank the motion hypotheses 110, and select the best motion 106. We use a learning method 104 to determine the parameters of die scoring function 120.

Computation of 2D and 3D Primitives

Points:

We can compute the 2D point primitives using interest point detectors such as a Harris affine region detector. Matching between the 2D point primitives can be computed using descriptors such as speeded up robust feature (SURF). In order to compute the corresponding 3D point primitives for every 2D point, we find the 2D point matches between the left and the right images. Once the matches are identified, we use the intrinsic and extrinsic calibration parameters to obtain the projection matrices for both the images in a common coordinate system. Using triangulation we reconstruct the 3D point corresponding to the 2D point matches.

Lines:

We first detect 2D lines from individual images using line detectors such as LSD (line segment detector). We match the 2D lines in images using SURF descriptors on the end points of the line segments in the images. Once the 2D lines are matched in two images, then the reconstruction of 3D lines can be achieved by intersecting two planes defined by back-projecting the 2D lines based on the projection matrices for the left and right images.

Planes:

We use a stereo matching procedure such as semi-global stereo matching to obtain a depth map from the left and right images. Once we obtain the depth map, we use a plane fitting procedure, such as the 3-point RANSAC, to compute the planar segments in the 3D point cloud corresponding to the depth map.

There are two main novel components in this method that previous approaches have not considered before: motion estimation using hybrid correspondences and a learning procedure for the scoring function in RANSAC.

Motion Estimation Using Hybrid Correspondences

We compute 6 degrees of freedom (DOF) motion parameters (R,t) using both 2D and 3D correspondences. While considering 2D to 3D correspondences, the following configurations have been already solved using the ideas proposed in U.S. Pat. No. 8,442,305:

(1) Three 2D points in C1 are matched to three 3D points in C2. Using these matches we can compute the 6 DOF motion (R,t) using a $4^{th}$ degree equation.

(2) Two 2D points and one 2D line in C1 are matched to two 3D points and one 3D line in C2. Using these matches, we can compute 6 DOF motion (R,t) using a $4^{th}$ degree equation.

(3) One 2D point and two 2D lines in C1 are matched to one 3D point and two 3D lines in C2. Using these matches, we can compute 6 DOF motion (R,t) using an $8^{th}$ degree equation.

(4) Three 2D lines in C1 are matched to three 3D lines in C2. Using these matches, we can compute the 6 DOF motion (R,t) using an $8^{th}$ degree equation.

We can also compute the motion (R,t) using 3D points in C1 that lie on 3D planes in C2 using the ideas explored in U.S. Pat. No. 8,224,071. Here, we can compute the motion (R,t) using six 3D points in C1 that are matched to six 3D planes in C2. In U.S. Patent Application 20140003705, motion estimation using 3D point to 3D point and 3D plane to 3D plane correspondences are considered.

To the best of our knowledge, the following cases, shown bolded in Table 1, are not described in the prior art. It is not straightforward to derive the motion estimation procedure for the following cases using the existing cases.

(1) Three 2D to 2D point correspondences and one 3D to 3D point correspondences:

Using a single 3D point to 3D point correspondence, we can compute the translation (3 DOF) between the two stereo pairs. We use the three 2D to 2D point correspondences to compute the rotation matrix (3 DOF).

(2) One 2D to 2D point correspondence and two 3D to 3D point correspondences:

Using two 3D to 3D point correspondences, we can compute 5 DOF (3 DOF translation and 2DOF rotation). Using a single 2D to 2D correspondence, we can compute the remaining 1 DOF rotation.

Parameter Learning for Scoring Function

To the best of our knowledge, we are not aware of any procedure that uses parameter learning techniques for generating the scoring function in RANSAC for stereo-odometry procedures. Most prior techniques use heuristics and trial-and-error procedures to develop the scoring function. We use data with ground truth motion for generating positive and negative examples used in the parameter learning procedures.

We briefly describe the formulation of our parameter learning procedure. We describe a family of different motion estimation procedures that takes a few correspondences using a minimal set of correspondences based on points, lines and planes, as shown in Table 1. Given the minimal set of correspondences, we can compute the motion (R,t). Based on a given (R,t), we can compute miters from all the available correspondences; we check the points, lines and planes that agree with, the motion based on a threshold. Typically, the motion (R,t) that generates the maximum number of inliers is selected as the best motion. However, when we have hybrid correspondences we are not sure how to select the best motion. Choosing some motion based on only the number of inliers might not be the right criteria, because lines and planes are stronger cues compared to points. Thus we would like to learn a function that gives different weights to the different types of inliers and also gives priority based on the location of these inliers in the images. The weights learned using the structured learning are different for points, lines and planes, and different for different locations of an image. The weights are also learned for the motion parameters.

Let the different motion estimation procedures be represented by $M_i$, where $i \in \{1, 2, 3, \ldots, n\}$. Each of these motion estimation procedures takes a minimal set of correspondences and generates a motion (R,t). Based on this motion we can compute the inlier set $I_i$ which consists of point, line and plane correspondences that agree with the motion. In other words, we use the motion to project the point from one stereo pair to another and check if the points are within a threshold. Similarly we can check for line and plane correspondences. Summarizing, every motion hypothesis $M_i=(R_i, t_i)$ generates an inlier set $I_i$. We can represent a pair consisting of a motion and its corresponding inlier as $(M_i,I_i)$. We describe our learning procedure using ground truth motion that can be collected with high accuracy GPS or other sensors.

Given inliers $\{I_1, I_2, \ldots, I_n\}=I$ and corresponding motions $\{M_1, M_2, \ldots, M_n\}=M$, we learn a mapping $g: I, M \rightarrow R$ to identify the optimal motion. We learn the mapping in such a manner that for the correct motion $M_i$ and its corresponding inlier set $I_i$, the function $g(M_i,I_i)$ is large. We also ensure that for any motion $M_j$, $i \neq j$ that is not the correct motion, $g(M_j,I_i)$ decreases as the deviation between the motions $\Delta(M_j,M_i)$ increases. Usually, the function g is of the form $g(I)=w^T \psi(M,I)$, where w is a parameter vector that we learn, and $\psi(M,I)$ is a vector of features that can be determined from the motion and the inlier set. The mapping function can be teamed discriminatively using a quadratic program formulated by structured output techniques.

We now describe how to build the features from the motion and the inlier set. We discretize the image into several rectangular blocks $x=\{x_1, x_2, \ldots, x_n\}$ where each block is denoted by the variable $x_i$. For each of the inlier, whether it is a 2D or a 3D primitive, we find a specific location in the image based on the subblock $x_i$. The function is $p(x_i)=1$ if there is at least one inlier point correspondence in the subblock, and $p(x_i)=0$ otherwise. Similarly the function is $l(x_i)=1$ if there is at least one inlier line correspondence in the subblock, and $l(x_i)=0$ otherwise. In the same manner, this function is $\pi(x_i)=1$ if there is at least one inlier plane correspondence in the subblock $x_i$, and $\pi(x_i)=0$ otherwise. We construct a feature vector using these intermediate functions as follows:

$$\Psi(M,I)=(a_1\ a_2\ a_3\ t_1\ t_2\ t_3\ p(x_i)\ p(x_2) \ldots l(x_i)\ l(x_2) \ldots \pi(x_i)\ \pi(x_2) \ldots)^T$$

Here the parameters $(a_1,a_2,a_3)$ denote the three Euler angles for the rotation matrix. The parameters $(t_1,t_2,t_3)$ denote the three translation parameters of the motion.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a motion between a first and second coordinate system, comprising the steps of:
    extracting a first set of primitives from a 3D image acquired in the first coordinate system from an environment;
    extracting a second set of primitives from a 3D image acquired in the second coordinate system from the environment;
    generating motion hypotheses for the first and second sets of primitives using a RANdom SAmple Consensus procedure;
    determining a score for each motion hypothesis using a scoring function learned using parameter learning techniques, wherein parameters of the scoring function are determined using training data in a structured learning procedure; and
    selecting, based on the score, a best motion hypothesis as the motion between the first and second coordinate system.

2. The method of claim 1, wherein the set of primitives corresponds to points, lines and planes.

3. The method of claim 1, wherein the points and lines are in two dimensional or three dimensional space, and the planes are in three dimensional space.

4. The method of claim 1, wherein a subset of the primitives selected in the first coordinate system is same as the subset of the primitives selected in the second coordinate system.

5. The method of claim 1, wherein the subset of the primitives selected in the first coordinate system is different from the subset of primitives selected in the second coordinate system.

6. The method of claim 1, wherein the motion hypotheses are generated using combinations of the primitives as shown in Table 1.

7. The method of claim 1, wherein the motion hypotheses are generated using 3 points in 2D space and 1 point in 3D space from the first coordinate system, and 3 points in 2D space and 1 point in 3D space from the second coordinate system.

8. The method of claim 1, wherein the motion hypotheses are generated using 1 point in 2D space and 2 points in 3D space from the first coordinate system, and 1 point in 2D space and 2 points in 3D space from the second coordinate system.

9. The method of claim 1, wherein a ground truth motion for the training data is obtained using a global positioning system.

10. The method of claim 1, wherein a ground truth motion for the training data is obtained using inertial measurement units.

11. The method of claim 1, wherein the parameters learned using the structured learning procedure are different for points, lines and planes.

12. The method of claim 1, wherein the parameters learned using the structured learning procedure are different for different locations of the image.

13. The method of claim 1, wherein the parameters are learned for the motion.

14. The method of claim 1, wherein the 3D image is obtained using a stereo or trinocular stereo camera.

15. The method of claim 1, wherein the 3D image is obtained using a red, green, blue and depth sensor.

* * * * *